US011196350B2

(12) United States Patent
Paduvalli

(10) Patent No.: US 11,196,350 B2
(45) Date of Patent: Dec. 7, 2021

(54) DC-DC POWER CONVERTER CONTROL TECHNIQUES

(71) Applicant: Analog Devices International Unlimited Company, Limerick (IE)

(72) Inventor: Vikas Paduvalli, San Jose, CA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/562,006

(22) Filed: Sep. 5, 2019

(65) Prior Publication Data

US 2021/0075330 A1    Mar. 11, 2021

(51) Int. Cl.
*H02M 3/335*    (2006.01)

(52) U.S. Cl.
CPC .............................. *H02M 3/33576* (2013.01)

(58) Field of Classification Search
CPC .............. H02M 3/33576; H02M 3/33569
See application file for complete search history.

(56) References Cited

U.S. PATENT DOCUMENTS

| 4,581,692 | A |   | 4/1986  | Nayberg et al. |
|-----------|---|---|---------|----------------|
| 4,914,561 | A |   | 4/1990  | Rice et al.    |
| 5,057,986 | A |   | 10/1991 | Henze et al.   |
| 5,132,888 | A |   | 7/1992  | Lo et al.      |
| 5,555,494 | A |   | 9/1996  | Morris         |
| 5,712,772 | A | * | 1/1998  | Telefus .................... H02M 1/38 |
|           |   |   |         | 363/21.02      |
| 5,754,413 | A |   | 5/1998  | Fraidlin et al. |
| 5,838,552 | A | * | 11/1998 | Fraidlin ............ H02M 3/33569 |
|           |   |   |         | 363/16         |
| 6,147,886 | A | * | 11/2000 | Wittenbreder .... H02M 3/33592 |
|           |   |   |         | 363/132        |

(Continued)

FOREIGN PATENT DOCUMENTS

| CN | 106026676 A      | 10/2016 |
|----|------------------|---------|
| WO | WO-2016001547 A1 | 1/2016  |

(Continued)

OTHER PUBLICATIONS

Borage, Mangesh, et al., "A Full-Bridge DC-DC Converter With Zero-Voltage-Switching Over the Entire Conversion Range", IEEE Transactions on Power Electronics, 23(4), (Jul. 2008), 8 pgs.

(Continued)

*Primary Examiner* — Kyle J Moody
(74) *Attorney, Agent, or Firm* — Schwegman Lundberg & Woessner, P.A.

(57) ABSTRACT

Techniques for an isolated DC-DC converter are provided. In an example, a method of operating an isolated DC-DC converter can include inducing a first, primary current flow in primary windings of a first transformer and a second transformer during a first interval, inducing a second, primary current flow in the primary windings during a second interval, freewheeling current of the primary windings via a ground connection of the primary windings during transitions between the first interval and the second interval, and repeatedly alternating between the first interval and the second interval to generate a single DC output voltage using a secondary winding of the first transformer and a secondary winding of the second transformer.

19 Claims, 4 Drawing Sheets

(56) References Cited

U.S. PATENT DOCUMENTS

| | | | |
|---|---|---|---|
| 6,765,810 B2* | 7/2004 | Perry | H02M 3/33592 |
| | | | 363/21.06 |
| 7,034,647 B2 | 4/2006 | Yan et al. | |
| 7,969,752 B2* | 6/2011 | Bong | H02M 3/33576 |
| | | | 363/17 |
| 8,064,228 B2* | 11/2011 | Lee | H02M 3/33569 |
| | | | 363/21.02 |
| 8,218,338 B2* | 7/2012 | Lin | H02M 1/10 |
| | | | 323/266 |
| 9,577,540 B1* | 2/2017 | Xiong | H02M 3/3353 |
| 10,181,797 B2* | 1/2019 | Sadki | H02M 3/156 |
| 10,297,379 B2* | 5/2019 | Gold | H01F 27/24 |
| 10,601,327 B2* | 3/2020 | DeSousa | H02K 1/02 |
| 2004/0022075 A1 | 2/2004 | Perry | |
| 2005/0024894 A1 | 2/2005 | Liu et al. | |
| 2006/0152950 A1* | 7/2006 | Reddy | H02M 1/15 |
| | | | 363/39 |
| 2008/0278969 A1* | 11/2008 | Bolz | H02J 7/0018 |
| | | | 363/17 |
| 2011/0069513 A1* | 3/2011 | Lee | H02M 3/33569 |
| | | | 363/16 |
| 2014/0104891 A1 | 4/2014 | Kim et al. | |
| 2015/0092451 A1* | 4/2015 | Popovici | H02M 3/33569 |
| | | | 363/17 |
| 2015/0256087 A1 | 9/2015 | Jitaru | |
| 2017/0222567 A1 | 8/2017 | Desousa | |

FOREIGN PATENT DOCUMENTS

| | | |
|---|---|---|
| WO | WO-2016059352 A1 | 4/2016 |
| WO | WO-2016059354 A1 | 4/2016 |
| WO | WO-2017064220 A1 | 4/2017 |
| WO | WO-2018177674 A1 | 10/2018 |

OTHER PUBLICATIONS

Henze, C. P., et al., "Zero-Voltage Switching in High Frequency Power Converters Using Pulse Width Modulation", 3rd Annual IEEE Applied Power Electronics Conference and Exposition (APEC), (1988), 8 pgs.

Koo, Gwan-Bon, et al., "Analysis and Design of Phase Shift Full Bridge Converter With Series-Connected Two Transformers", IEEE Transactions on Power Electronics, 19(2), (Mar. 2004), 9 pgs.

* cited by examiner

DC-DC POWER CONVERTER CONTROL TECHNIQUES

TECHNICAL FIELD OF THE DISCLOSURE

The present disclosure is related to switching circuits and more particularly simplified techniques for a full bridge converter.

BACKGROUND

Full bridge converters can be used for a wide range of applications such as, but not limited to, a driver circuit for a low dropout switching power supply, a driver for a load such as a motor load, other inductive loads, a resistive load, a capacitive load or combination thereof. Conventional full bridge converters can rely on an isolation element to convert voltage and transmit power, and an additional storage device such as an inductor or capacitor to assist with conditioning or stability.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
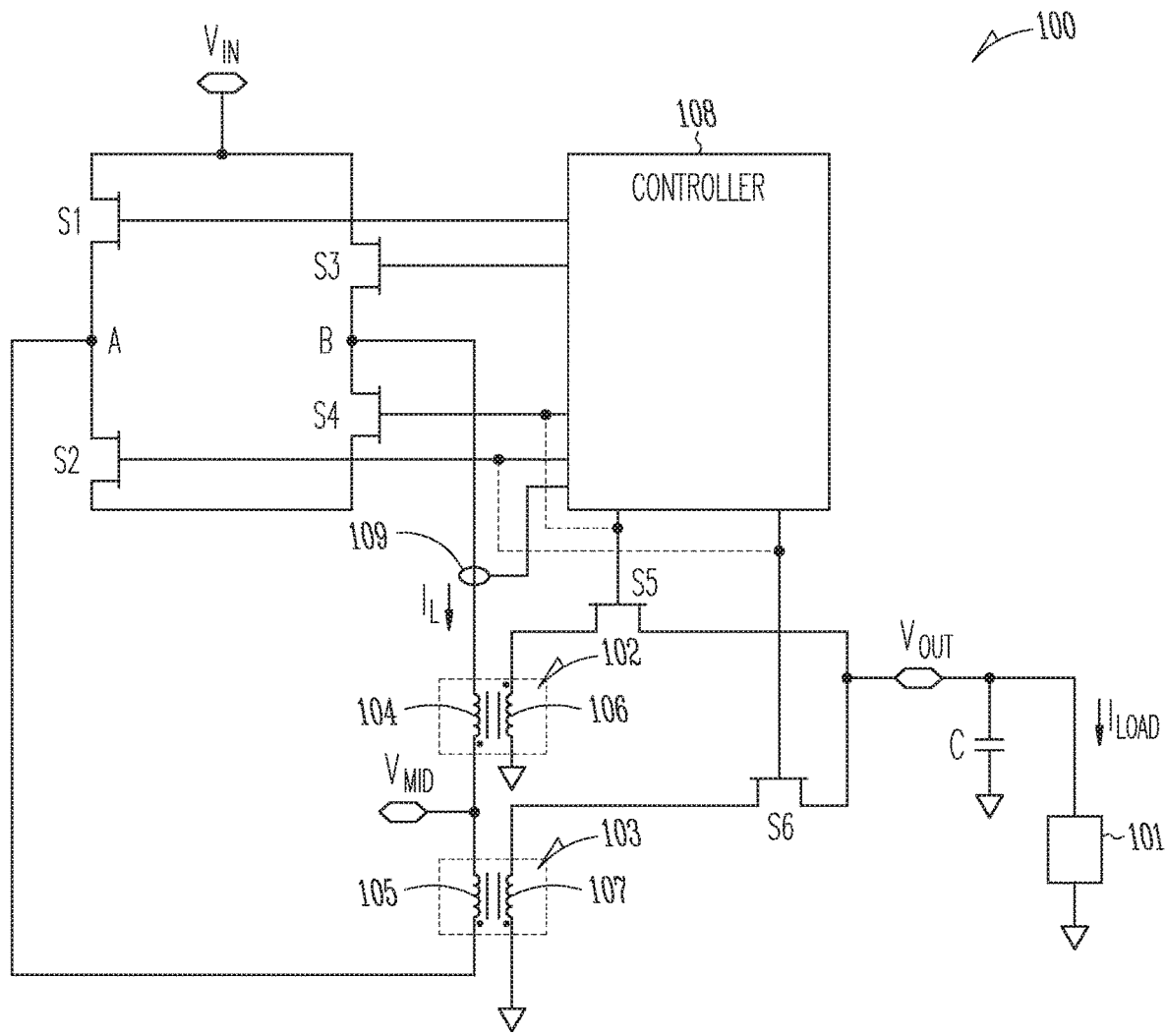
FIG. 1 illustrates generally an example power converter 100 according to the present subject matter coupled to an optional output filter (C) and a load 101.

The present inventor has recognized improved techniques for a full bridge power converter. FIG. 1 illustrates generally an example power converter 100 according to the present subject matter coupled to an optional output filter (C) and a load 101. The power converter can include a first transformer 102, a second transformer 103, a first set of switches (S1, S2, S3, S4) coupled to the primary windings 104, 105 of the first and second transformers 102, 103, a second set of switches (S5, S6) coupled to the secondary windings 106, 107 of the first and second transformers 102, 103, a controller 108 for controlling the first set of switches (S1, S2, S3, S4) and the second set of switches (S5, S6), and a current sensor 109. In certain examples, one or more of the first set of switches (S1, S2, S3, S4) or the second set of switches can be a diode. The first set of switches (S1, S2, S3, S4) can include a first switch (S1) coupled in series with a second switch (S2) between an input supply ($V_{IN}$) and ground, and a third switch (S3) coupled in series with a fourth switch (S4) between the input supply ($V_{IN}$) and ground. The primary winding 104 of the first transformer 102 can be coupled in series with the primary winding 105 of the second transformer 103 between a first intermediate node (A) coupling the first switch (S1) with the second switch (s2), and a second intermediate node (B) coupling the third switch (S3) with the fourth switch (S4). Unlike conventional power converters, a storage device such as a capacitor is not coupled directly to an intermediate node connecting the primary windings with each other. Also, unlike conventional power converters, the storage device does not include an additional input inductor coupled between (e.g., in series with) the first set of switches and the input supply, or an additional output inductor coupled between (e.g., in series with) the second set of switches and the load.

The controller 108 can operate the first set of switches (S1, S2, S3, S4) in three phases with a delay between transitions of the phases to mitigate shoot through current. In a first phase, the first switch (S1) and the fourth switch (S4) can be operated in a low impedance mode to initiate and conduct current ($I_L$) through the series-connected primary windings 104, 105. During the first phase, the controller 108 can operate the second switch (S2) and the third switch (S3) in a high impedance mode. In certain examples, the primary winding current ($I_L$) can be sensed and compared with a current threshold. In other examples, the first set of switches (S1, S2, S3, S4) can be timed and operated without regard to the level of the primary winding current ($I_L$).

As the current through the primary windings 104, 105 of the first and second transformers 102, 103 changes, a voltage and current can be induced in the secondary windings 106, 107 of the first and second transformers 102, 103. For the particular situation described above during the first phase, a first rectifier switch (S5) of the second set of switches (S5, S6) can allow power transfer from the secondary winding 106 of the first transformer 102 to the load 101 while a second rectifier switch (S6) blocks power transfer between the load 101 and the secondary winding 107 of the second transformer 103. When the given interval of time for the first phase has expired, or the primary winding current ($I_L$) has reached the threshold, the controller 108 can transition operation of the first set of switches (S1, S2, S3, S4) from the first phase to a second phase. In certain examples, with the first switch (S1) and the fourth switch (S4) conducting, the first transformer 102 acts as to transfer energy across to the secondary winding, and the second transformer 103 acts to store energy in the core.

During the second phase, the first switch (S1) and the third switch (S3) can be operated in a high impedance mode and the second switch (S2) and fourth switch (S4) can be operated in a low impedance mode. Transitioning from the first phase to the second phase can include turning off the first switch (S1) and turning on the second switch (S2). In certain examples, the controller 108 can command the transition of the first switch (S1) and the second switch (S2) to happen simultaneously. In some examples, the controller 108 can delay the transition of the second switch (S2) from the transition of the first switch (S1) to mitigate the potential of shorting the input supply ($V_{IN}$) to ground via the series connection of the first switch (S1) and the second switch (S2). During the second phase of operation of the power converter 100, stored energy of the primary winding 104 of the first transformer 102 or the primary winding 105 of the second transformer 103 can be allowed to freewheel. The freewheeling current can induce corresponding secondary current such that both rectifier switches (S5, S6) allow power to transfer to the load 101. Termination of the second phase can be timed or can depend on a level of primary winding current ($I_L$).

Upon termination of the second phase, the controller 108 can transition operation of the first set of switches (S1, S2, S3, S4) from the second phase to a third phase. In the third phase, the second switch (S2) and the third switch (S3) can be operated in a low impedance mode to initiate and conduct current through the series-connected primary windings 104, 105. During the third phase, the controller 108 can operate the first switch (S1) and the fourth switch (S4) in a high impedance mode. Transitioning from the second phase to the third phase can include turning off the fourth switch (S4) and turning on the third switch (S3). In certain examples, the controller 108 can command the transition of the fourth switch (S4) and the third switch (S3) to happen simultaneously. In some examples, the controller 108 can delay the transition of the third switch (S3) from the transition of the fourth switch (S4) to mitigate the potential of shorting the input supply ($V_{IN}$) to ground via the series connection of the third switch (S3) and the fourth switch (S4). In certain examples, the primary winding current ($I_L$) provided by the low impedance operation of the second and third switches (S2, S3) can be sensed and compared with a current threshold. In other examples, the first set of switches (S1, S2, S3, S4) can be timed and operated without regard to the level of the primary winding current ($I_L$). In certain examples, with the second switch (S2) and the third switch (S3) conducting, the second transformer 103 acts as to transfer energy across to the secondary winding, and the first transformer 102 acts to store energy in the core.

As the current through the primary windings 104, 105 of the first and second transformers 102, 103 change, a voltage and current can be induced in the secondary windings 106, 107 of the first and second transformers 102, 103. For the particular situation described above during the third phase, the second rectifier switch (S6) can allow power transfer from the secondary winding 107 of the second transformer 103 to the load 101 while the first rectifier switch (S5) blocks power transfer between the load 101 and the secondary winding 106 of the first transformer 102. When the given interval of time for the third phase has expired, or the primary winding current ($I_L$) has reached the threshold, the controller 108 can transition operation of the first set of switches (S1, S2, S3, S4) from the third phase to the second phase.

As discussed above, during the second phase, the first switch (S1) and the third switch (S3) can be operated in a high impedance mode and the second and fourth switches (S2, S4) can be operated in a low impedance mode. Transitioning from the third phase to the second phase can include turning off the third switch (S3) and turning on the fourth switch (S4). In certain examples, the controller 108 can command the transition of the third switch (S3) and the fourth switch (S4) to happen simultaneously. In some examples, the controller 108 can delay the transition of the fourth switch (S4) from the transition of the third switch S3 to mitigate the potential of shorting the input supply ($V_{IN}$) to ground via the series connection of the third switch (S3) and the fourth switch (S4). Again, during the second phase of operation of the power converter, stored energy of the primary winding 104 of the first transformer 102 or the primary winding 105 of the second transformer 103 can be allowed to freewheel. The freewheeling current can induce corresponding secondary current such that both rectifier switches (S5, S6) can allow power to transfer to the load 101. Termination of the second phase can be timed or can depend on a level of primary winding current.

Upon termination of the second phase, the controller 108 can transition operation of the first set of switches (S1, S2, S3, S4) from the second phase to the first phase. As discussed above, during the first phase, the first switch (S1) and the fourth switch (S4) can be operated in a low impedance mode to initiate and conduct current ($I_L$) through the series-connected primary windings 104, 105, and the second and third switches (S2, S3) can be operated in a high impedance mode.

Transitioning from the second phase to the first phase can include turning off the second switch (S2) and turning on the first switch (S1). In certain examples, the controller 108 can command the transition of the second switch (S2) and the first switch (S1) to happen simultaneously. In some examples, the controller 108 can delay the transition of the first switch (S1) from the transition of the second switch (S2) to mitigate the potential of shorting the input supply ($V_{IN}$) to via the series connection of the first switch (S1) and the second switch (S2). In certain examples, the first set of switches (S1, S2, S3, S4) can be two sets of power switches. Each pair can be a set of power transistors commonly used for a power stage, for example. In certain examples, each pair can be a set of power transistors commonly used for a power stage of a synchronous buck converter.

In certain examples, the controller can be less complex that that shown as the control signal for the first rectifier switch (S5) can be the same control signal used for the fourth switch (S4). In some examples, the control signal for the second rectifier switch (S6) can be the same control signal used for the second switch (S2). The output voltage ($V_{OUT}$) can depend on a number of factors such as, but not limited to, the input voltage ($V_{IN}$) level, the duty cycle of the first set of switches (S1, S2, S3, S4), or the turns ratio of the first and second transformers 102, 103. The power converter 100 can be either a step-up or a step-down power converter. In certain examples, the turns ratio of the transformers 102, 103 can allow the output voltage ($V_{OUT}$) to be very different than the input voltage ($V_{IN}$).

Figure 2A:
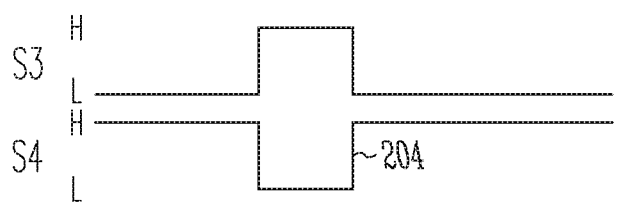
FIGS. 2A and 2B illustrate graphically various signals of an example DC-DC power converter according to the present subject matter.
Figure 2A:
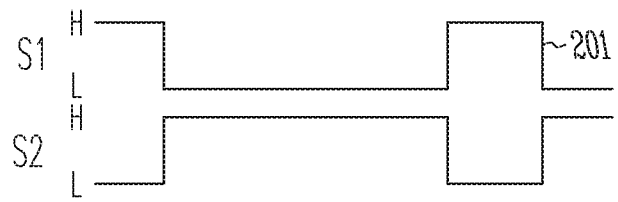
Figure 2A:
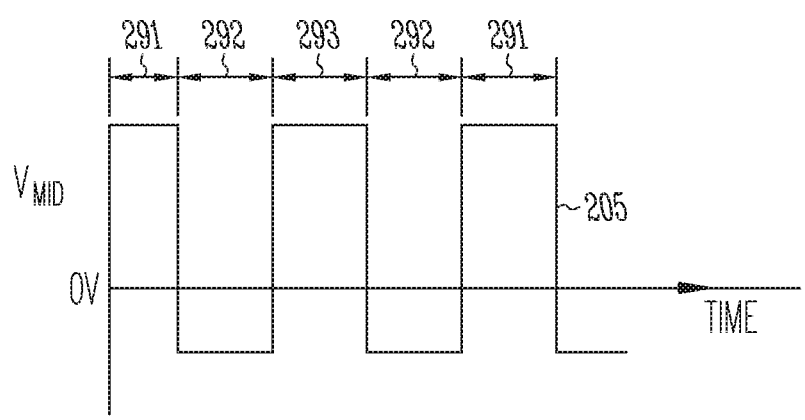
Figure 2A:
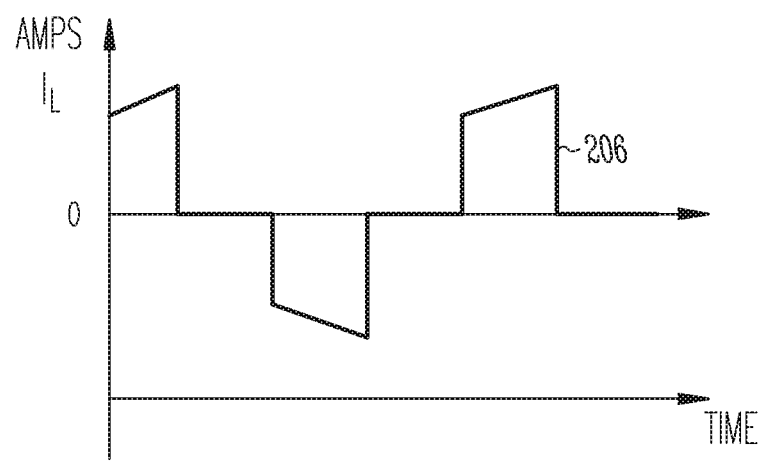
Figure 2B:
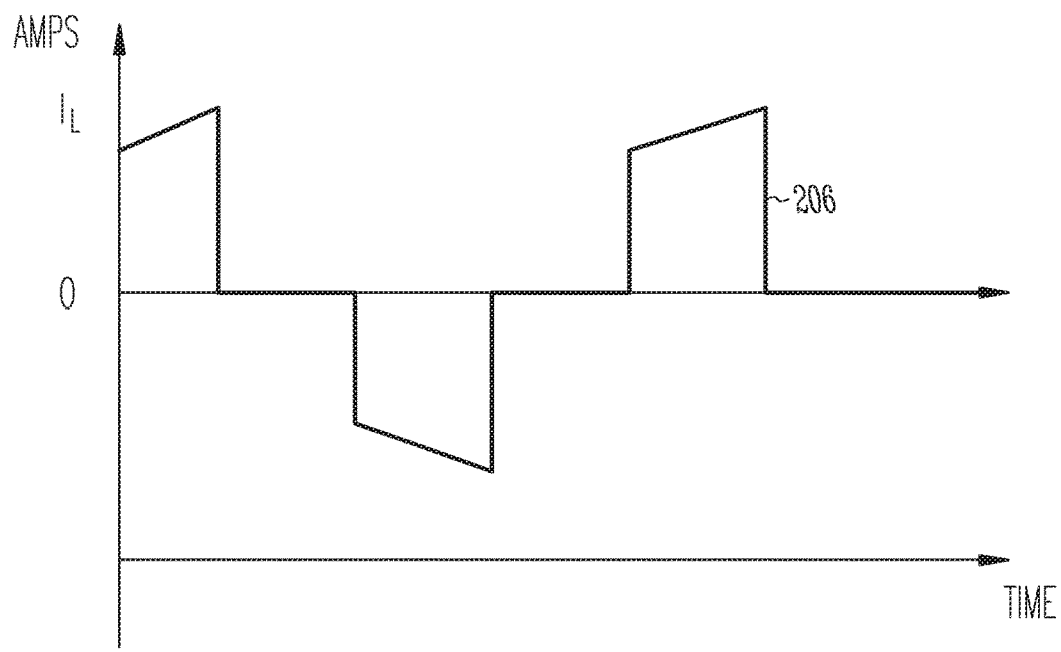
Figure 2B:
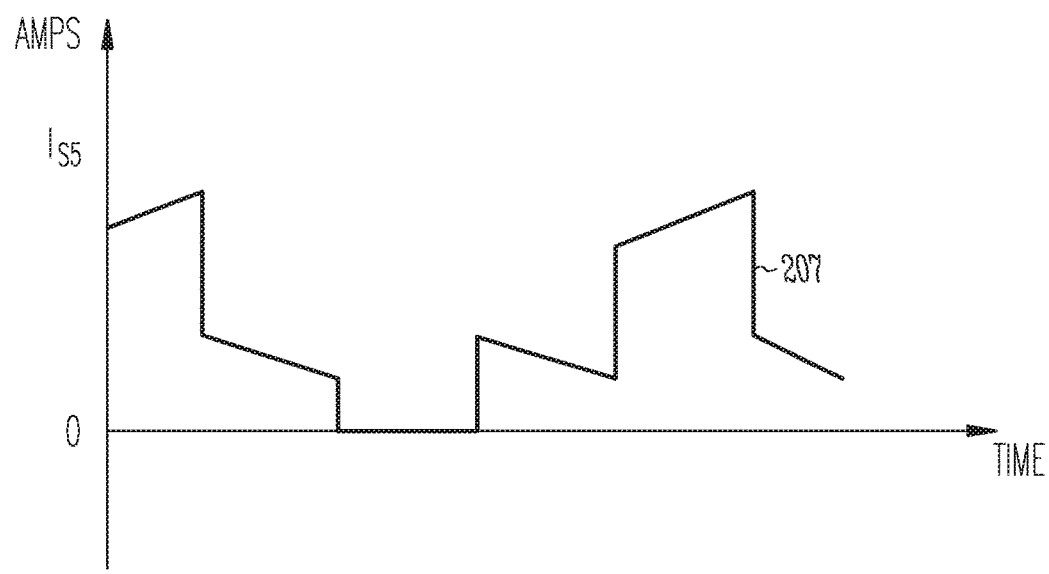
Figure 2B:
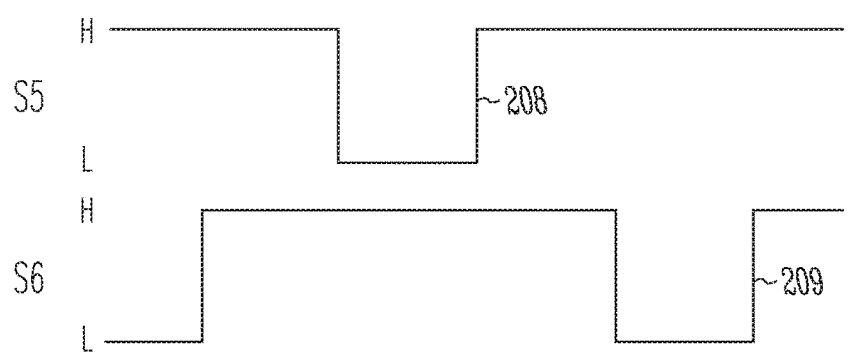

FIGS. 2A and 2B illustrate graphically various signals of an example DC-DC power converter according to the present subject matter. The control voltages 201, 202, 203, 204 of the first set of switches (S1, S2, S3, S4), respectively, are shown with respect to time when the switches are selected to assume a low-impedance state with a logic high control signal although the present subject matter is not so limited. FIG. 2A also shows a plot of the voltage 205 at the midpoint node ($V_{MID}$) of the series connected primary windings 104, 105 of the first and second transformers 102, 103 with respect to time. FIG. 2A also shows the current 206 of the series connected primary windings for the circuit of FIG. 1 as the first set of switches (S1, S2, S3, S4) are operated as shown and the input voltage ($V_{IN}$) is applied to the primary windings.

FIG. 2B again shows the current 206 of the series connected primary windings for the circuit of FIG. 1 as the first set of switches (S1, S2, S3, S4) are operated as shown and the input voltage ($V_{IN}$) is applied to the primary windings. FIG. 2B also shows the current 207 passing through one of the rectifier switches (S5) and the control signals 208, 209 for an embodiment when the rectifier switches (S5, S6) are transistors although the present subject matter is not so limited. Each of the plots of FIGS. 2A and 2B show the first phase 291, second phase 292 and third phase 292 operation as discussed above with respect to FIG. 1.

Figure 3:
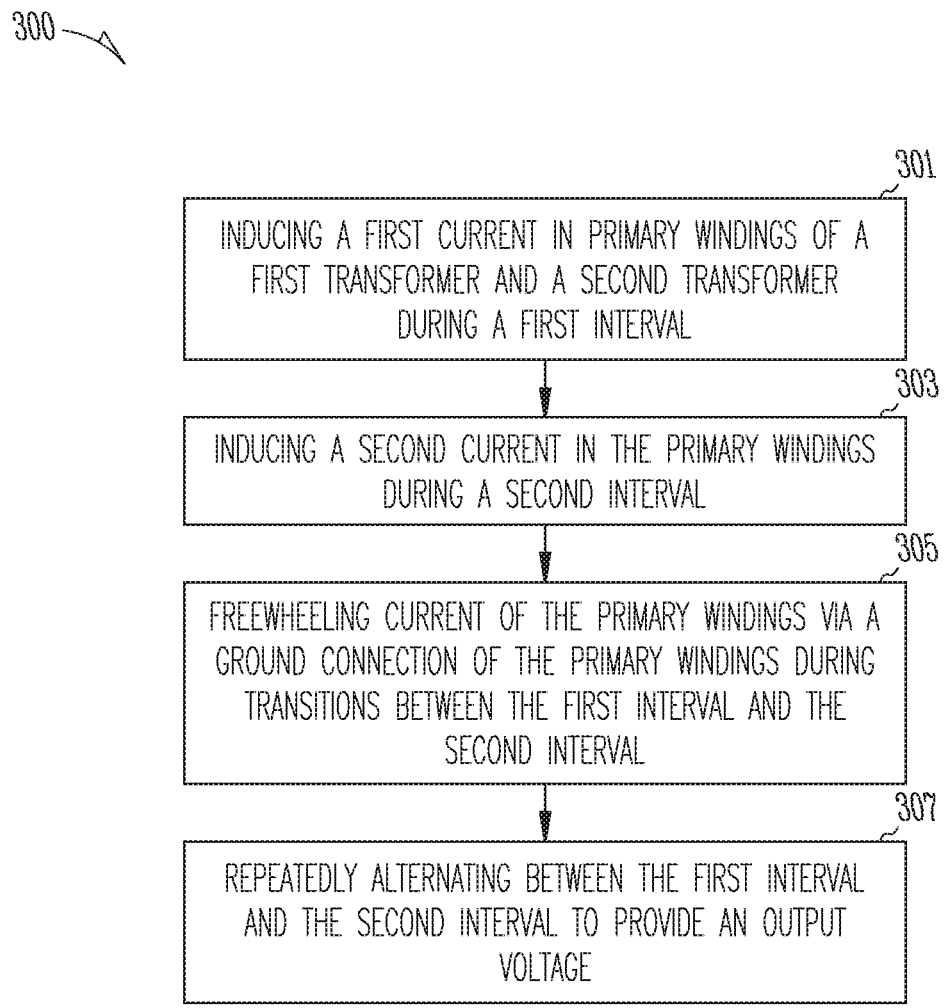
FIG. 3 illustrates a flowchart of example method 300 of operating a DC-DC power converter having two transformers.

FIG. 3 illustrates a flowchart of example method 300 of operating a DC-DC power converter having two transformers. The method can include, at 301, during a first state, inducing a first, primary current flow in primary windings of a first transformer and a second transformer during a first interval. In certain examples, the current flow can be achieved by coupling a first end of the series-connected primary windings to a voltage supply via a first supply switch and a second end of the series-connected primary windings to ground via a second supply switch. The current of the primary windings can induce a voltage at the secondary windings of each transformer. A first output switch can allow current of one of the secondary windings, for example, the secondary winding of the first transformer, to flow to an output node of the DC-DC power converter in response to the first, primary current flow. A second output switch can prevent current flow of the secondary winding of the second transformer.

At 303, during a second state, a second, primary current flow via the primary windings of the first transformer and the second transformer can be induced during a second interval. The second, primary current flow can be initiated in a direction opposite that of the first, primary current flow. In certain examples, the second, primary current flow can be achieved by coupling the first end of the series-connected primary windings to ground via a third supply switch and the second end of the series-connected primary windings to the supply voltage via a fourth supply switch. The current of the primary windings can induce a voltage at the secondary windings of each transformer. The second output switch can allow current of the secondary windings of the second transformer to flow to an output node of the DC-DC power converter in response to the second, primary current flow. The first output switch can prevent current flow of the secondary winding of the first transformer.

At 305, current of the primary winding can be allowed to freewheel by placing the primary windings in a freewheeling state. For example, current of the primary winding can be allowed to freewheel by connecting the first end of the series-connected primary windings to ground via the third supply switch and the second end of the series-connected primary windings to ground via the second supply switch. The freewheeling current can induce current flow of the secondary windings of both the first transformer and the second transformer to the output node of the DC-DC power converter via the respective output switch. In certain examples, the output switches can be transistors receiving control signals from a controller. In some examples, the output switches can be diodes or diode emulating transistors. In some examples, the output switches can be power diodes with their cathodes connected to the output voltage ($V_{OUT}$). In certain examples, the freewheeling state can be executed as the DC-DC power converter transitions between the first state and the second state.

At 307, the controller of the DC-DC power converter can provide power at a desired output voltage ($V_{OUT}$) by repeatedly alternating between the first state and the second state and can place the DC-DC power converter in the freewheeling state between each transition. In certain examples, the controller can use a timer to initiate transition between each state of the DC-DC power converter. In certain examples, the controller can receive an indication of a magnitude of the current of the series-connected primary windings and can initiate a transition from the first state or the second state when the magnitude of the primary winding current reaches a threshold. In some examples, the controller can include a comparator to compare the primary winding current indication with the threshold. In some examples, the controller can include a comparator for each state of the DC-DC power converter.

Various Notes & Examples

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, the terms "including" and "comprising" are open-ended, that is, a system, device, article, composition, formulation, or process that includes elements in addition to those listed after such a term are still deemed to fall within the scope of subject matter discussed. Moreover, such as may appear in a claim, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of a claim. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. The following aspects are hereby incorporated into the Detailed Description as examples or

What is claimed is:

1. A DC-DC power converter comprising:
   a first transformer;
   a second transformer having a primary winding directly coupled in series with a primary winding of the first transformer;
   a first set of switches configured to selectively couple the primary windings of the first and second transformers with an input supply;
   a first rectifier switch coupled in series with a secondary winding of the first transformer to selectively connect the secondary winding of the first transformer to an output node of the DC-DC power converter without requiring an inductor-based filter coupled between the secondary winding of the first transformer and the output node;
   a second rectifier switch coupled in series with a secondary winding of the second transformer to selectively connect the secondary winding of the second transformer to the output node of the DC-DC power converter without requiring an inductor-based filter coupled between the secondary winding of the second transformer and the output node; and
   a controller configured to couple the primary windings with a supply voltage during a first interval and during a second interval, and to isolate the supply voltage from the primary windings and allow energy of the primary windings to freewheel via two switches coupled to ground during transitions between the first interval and the second interval, wherein the first set of switches includes the two switches.

2. The DC-DC power converter of claim 1, including a reference terminal; and
   wherein the first rectifier and the second rectifier are coupled directly to the reference terminal.

3. The DC-DC power converter of claim 1, wherein the DC-DC power converter does not include a separate, inductor-based filter coupled to the primary winding of the first transformer or the primary winding of the second transformer.

4. The DC-DC power converter of claim 1, wherein the DC-DC power converter does not include a separate inductor-based filter coupled to the first rectifier switch or the second rectifier switch.

5. The DC-DC power converter of claim 1, wherein the first transformer includes a single primary winding and a single secondary winding.

6. The DC-DC power converter of claim 1, wherein the second transformer includes a single primary winding and a single secondary winding.

7. The DC-DC power converter of claim 1, wherein the first rectifier switch is a transistor.

8. The DC-DC power converter of claim 1, wherein the second rectifier switch is a transistor.

9. The DC-DC power converter of claim 1, wherein a direct magnetic coupling mechanism of the first transformer is distinct from a direct magnetic coupling mechanism of the second transformer.

10. A method of operating an isolated dc-dc converter, the method comprising:
    inducing a first, primary current flow in primary windings of a first transformer and a second transformer during a first interval;
    inducing a second, primary current flow in the primary windings during a second interval;
    freewheeling current of the primary windings via a ground connection of the primary windings during transitions between the first interval and the second interval; and
    repeatedly alternating between the first interval and the second interval to generate a single DC output voltage using a secondary winding of the first transformer and a secondary winding of the second transformer,
    operating a first rectifier switch coupled in series with the secondary winding of the first transformer to selectively connect the secondary winding of the first transformer to an output node without requiring an inductor-based filter coupled between the secondary winding: of the first transformer and the output node;
    operating a second rectifier switch coupled in series with the secondary winding of the second transformer to selectively connect the secondary winding of the second transformer to the output node without requiring an inductor-based filter coupled between the secondary winding of the second transformer and the output node;
    wherein the primary windings of the first transformer and the second transformer are directly connected in series.

11. The method of claim 10, including inducing first, secondary current flow in a secondary winding of the first transformer in response to the first primary current flow to provide an output voltage of the converter; and
    blocking second, secondary current flow induced in the secondary winding of the second transformer by the first primary current flow.

12. The method of claim 10, wherein the second transformer is configured to emulate an inductor when the first primary current flow is induced.

13. The method of claim 10, including:
    inducing second primary current flow in primary windings of the first transformer and the second transformer;
    blocking a third, secondary current flow induced in the secondary winding of the first transformer by the second primary current flow; and
    inducing fourth, secondary current flow in the secondary winding of the second transformer in response to the second, primary current flow to provide the output voltage of the converter.

14. The method of claim 13, wherein the first transformer is configured to emulate an inductor when the second primary current flow is induced.

15. The method of claim 13, coupling the primary winding in series and to ground to allow current in the primary windings to freewheel to provide freewheeling current; and
    rectifying current induced in the secondary windings of the first and second transformers by the freewheeling current to provide the output voltage of the converter.

16. A DC-DC power converter comprising:
    means for inducing current from a supply source referenced to a ground potential;
    an isolator comprising a first transformer and a second transformer, wherein a primary winding of the first transformer and a primary winding of the second transformer are coupled directly in series with one another and are electrically coupled to the means for inducing current;
    means for rectifying current to a load without requiring an inductor-based filter coupled between secondary windings of the first and second transformers and the load; and wherein the means for inducing current is configured to free-wheel current of the primary windings of the first and second transformer with the ground potential to provide a portion of the current to the load.

17. The DC-DC power converter of claim 16, wherein the means for rectifying current to the load includes:
   a first output circuit coupled to the load, the first output circuit including a secondary winding of the first transformer and a first output switch coupled in series with each other between the load and the ground potential; and
   a second output circuit coupled to the load, the second output circuit including a secondary winding of the second transformer and a second output switch coupled in series with each other between the load and the ground potential.

18. The DC-DC power converter of claim 17, wherein one of the first output switch or the second output switch is a diode.

19. The DC-DC power converter of claim 17, wherein one of the first output switch or the second output switch is a transistor.

* * * * *